(12) United States Patent
Casarrubias et al.

(10) Patent No.: US 10,017,600 B2
(45) Date of Patent: Jul. 10, 2018

(54) ADHESIVE COMPOSITION

(71) Applicants: Dow Global Technologies LLC, Midland, MI (US); Rohm and Haas Company, Collegeville, PA (US)

(72) Inventors: Juan Carlos Casarrubias, Mexico City (MX); Angels Domenech, Sao Paulo (BR); Mateus Cipro, Sao Paulo (BR); Kevin Miyake, Ringwood, IL (US)

(73) Assignees: Dow Global Technologies LLC, Midland, MI (US); Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 15/533,383

(22) PCT Filed: Dec. 10, 2015

(86) PCT No.: PCT/US2015/064864
§ 371 (c)(1),
(2) Date: Jun. 6, 2017

(87) PCT Pub. No.: WO2016/100052
PCT Pub. Date: Jun. 23, 2016

(65) Prior Publication Data
US 2017/0369625 A1    Dec. 28, 2017

Related U.S. Application Data

(60) Provisional application No. 62/091,905, filed on Dec. 15, 2014.

(51) Int. Cl.
| | |
|---|---|
| *C08G 18/10* | (2006.01) |
| *C08G 18/66* | (2006.01) |
| *C08G 18/76* | (2006.01) |
| *C08G 18/36* | (2006.01) |
| *C09J 175/08* | (2006.01) |

(52) U.S. Cl.
CPC .............. *C08G 18/10* (2013.01); *C08G 18/36* (2013.01); *C08G 18/66* (2013.01); *C08G 18/6629* (2013.01); *C08G 18/7671* (2013.01); *C09J 175/08* (2013.01)

(58) Field of Classification Search
CPC ...................................................... C08G 18/10
See application file for complete search history.

(56) References Cited

U.S. PATENT DOCUMENTS

| | | | |
|---|---|---|---|
| 2005/0137324 A1* | 6/2005 | Roesler | C08G 18/10 524/589 |
| 2008/0105856 A1 | 5/2008 | DebRoy | |
| 2009/0149580 A1 | 6/2009 | Warren et al. | |
| 2012/0156506 A1* | 6/2012 | Shah | C08G 18/12 428/423.1 |

FOREIGN PATENT DOCUMENTS

| | | |
|---|---|---|
| DE | 102009046050 A1 | 4/2011 |
| WO | 2008/049745 A1 | 5/2008 |
| WO | 2013083565 A1 | 6/2013 |

OTHER PUBLICATIONS

Step, et al., "Mechanism of Polymer Stabilization by Hindered-Amine Light Stablilizers (HALS). Model Investigations of the Interaction of Peroxy Radicals with HALS Amines and Amino Ethers", Macromolecules, vol. 27, pp. 2529-2539 (1994).

* cited by examiner

Primary Examiner — Daniel H. Lee
(74) Attorney, Agent, or Firm — Carl P. Hemenway

(57) ABSTRACT

Provided is a two component adhesive composition comprising
  (I) an isocyanate component comprising an isocyanate-functional prepolymer that is the reaction product of reactants that comprise
    (A) one or more aromatic monomeric polyisocyanates and
    (B) one or more polyol, and
  (II) a polyol component comprising
    (A) one or more polyether polyol,
    (B) one or more fatty triglyceride, and
    (C) one or more UV absorber or one or more hindered amine light stabilizer or a combination thereof.
Also provided is a method of forming a laminate using such an adhesive, and a laminate made by that method.

11 Claims, No Drawings

ADHESIVE COMPOSITION

It is often desirable to provide a polyurethane composition that resists the tendency to turn yellow when exposed to ultraviolet (UV) radiation. For example, when the polyurethane composition is used as a laminating adhesive for a clear package, it is desirable that the package remain clear, without significant yellowing, for a long time so that the product and the package do not appear to be old, even after a period of storage and exposure to UV radiation. In the past, one approach to solving this problem was to use polyurethane compositions that were made from aliphatic polyisocyanates. Aliphatic polyisocyanates generally suffer from one or more of the following disadvantages: high expense, slow curing rate, and/or causing smearing when applied to surfaces printed with ink. It is desirable to provide a polyurethane composition suitable for making laminated structures that avoids one or more of the disadvantages of polyurethanes made from aliphatic polyisocyanates.

WO 2008/049745 describes incorporating ultraviolet light absorber and hindered amine light stabilizer into an aromatic polyurethane composition. It is desired to provide polyurethane compositions that avoid the disadvantages of polyurethanes made from aliphatic polyisocyanates and that provide improved resistance to yellowing when exposed to UV radiation. Also desired is a polyurethane that is useful as an adhesive for forming laminates.

The following is a statement of the invention.

A first aspect of the present invention is a method of forming a laminate comprising
  (a) forming an adhesive composition by bringing into contact components comprising
    (I) an isocyanate component comprising an isocyanate-functional prepolymer that is the reaction product of reactants that comprise
      (A) one or more aromatic polyisocyanates and
      (B) one or more polyol, and
    (II) a polyol component comprising
      (A) 0 to 50% by weight based on the weight of said polyol component, one or more polyether polyol,
      (B) one or more fatty triglyceride, and
      (C) one or more UV absorber or one or more hindered amine light stabilizer or a combination thereof,
  (b) applying a layer of said adhesive composition to a surface of a first film,
  (c) bringing said layer into contact with a surface of a second film to form a laminate;
  (d) after forming said laminate, curing said adhesive composition or allowing said adhesive composition to cure,
wherein steps (b) and (c) are performed at a time when 50 mole % or more of isocyanate groups on said prepolymer remain unreacted.

A second aspect of the present invention is a laminate formed by the method of the first aspect.

A third aspect of the present invention is a two component adhesive composition comprising
  (I) an isocyanate component comprising an isocyanate-functional prepolymer that is the reaction product of reactants that comprise
    (A) one or more aromatic monomeric polyisocyanates and
    (B) one or more polyol, and
  (II) a polyol component comprising
    (A) 0 to 50% by weight based on the weight of said polyol component, one or more polyether polyol,
    (B) one or more fatty triglyceride, and
    (C) one or more UV absorber or one or more hindered amine light stabilizer or a combination thereof.

The following is a detailed description of the invention.

As used herein, the following terms have the designated definitions, unless the context clearly indicates otherwise.

A polyisocyanate is a compound that contains two or more isocyanate groups. Polyisocyanate compounds may be monomeric or non-monomeric. An aromatic polyisocyanate is a polyisocyanate that contains one or more aromatic ring. A polyisocyanate that contains no aromatic rings is an aliphatic polyisocyanate.

A monomeric polyisocyanate is a polyisocyanate that has molecular weight of less than 1,000 and that has no urethane linkage and no urea linkage. Any polyisocyanate that is not a monomeric polyisocyanate is a non-monomeric polyisocyanate.

A compound with two or more hydroxyl groups is a polyol.

A compound that contains two or more ether linkages in the same linear chain of atoms is known herein as a polyether. A compound that contains two or more ester linkages in the same linear chain of atoms is known herein as a polyester. A compound that is a polyester and a polyol is a polyester polyol, and a compound that is a polyether and a polyol is a polyether polyol.

Polyols are characterized by the "hydroxyl number," which is determined by ASTM D 4274-88. Viscosity of polyols is characterized at 25° C. either by viscosity or by kinematic viscosity. Viscosity is assessed by ASTM D2196. Kinematic viscosity is assessed by ASTM D445-94.

As used herein, a compound is "volatile" if it has a boiling point at one atmosphere pressure of 200° C. or lower. As used herein, a "solvent" is a volatile compound that is liquid at one atmosphere pressure over a temperature range that includes 15° C. to 20° C. A composition is considered herein to be "solventless" if that composition contains a total of all solvents in the amount of 0-5% by weight, based on the total weight of the composition.

Some non-monomeric polyisocyanates are reaction products of one or more polyisocyanates with one or more polyols, where such reaction products have two or more un-reacted isocyanate groups. Such non-monomeric polyisocyanates may be, for example, the reaction products of one or more polyisocyanate with one or more polyols. A polyisocyanate that is a reaction product of one or more polyisocyanate with one or more polyols and that has molecular weight of 1,000 or more is known herein as a prepolymer.

As used herein, a "polyurethane" is a compound that contains a linear chain of atoms that contains three or more linkages selected from urethane linkages and urea linkages.

A composition is said herein to "cure" as chemical reactions that desirably effect an increase in the molecular weight of the composition and/or effect crosslinking of the composition so as to improve the properties of the composition take place. Such chemical reactions are known as "curing reactions." The composition is said to be "cured" when such reactions are complete or when the curing reactions have progressed sufficiently far that the properties of the composition are useful and are not appreciably changing over time. A composition that is capable of undergoing one or more curing reaction is a curable composition.

A "polymer," as used herein is a relatively large molecule made up of the reaction products of smaller chemical repeat units. Polymers may have structures that are linear, branched, star shaped, looped, hyperbranched, crosslinked, or a combination thereof; polymers may have a single type of repeat unit ("homopolymers") or they may have more than one type of repeat unit ("copolymers"). Copolymers may have the various types of repeat units arranged randomly, in sequence, in blocks, in other arrangements, or in any mixture or combination thereof. A polymer has number-average molecular weight of 1,000 or higher.

A film is a structure that is 0.5 mm or less in one dimension and is 1 cm or more in both of the other two dimensions. A polymer film is a film that is made of a polymer or mixture of polymers. The composition of a polymer film is 80% or more by weight one or more polymer, based on the weight of the film.

As used herein, a fatty group is an organic group containing a linear chain of 8 or more carbon atoms covalently bonded to each other. In a fatty group, the atoms attached to the carbon atoms may or may not be all hydrogens; one or more of the carbon atoms may or may not have one or more substituent groups, such as for example a hydroxyl group, attached. As used herein, a triglyceride is a compound whose molecule has the structure of a molecule of glycerol in which all three hydroxyl groups have been converted to ester linkages that link the glycerol residue to residues of three organic carboxylic acids. A fatty triglyceride is a triglyceride in which one or more of the residues of organic carboxylic acids contains a fatty group.

As used herein, a UV absorber is a compound that absorbs UV radiation in the range of 290 to 310 nm. When a UV absorber is dissolved in a solvent that does not react with the UV absorber and that is transparent to radiation from 290-310 nm, when the concentration of UV absorber is 0.2 g/L, and when the absorbance is tested at 25° C. with path length of 1 mm, the absorbance is 0.4 or greater over the range of 290-310 nm.

Hindered amine light stabilizers are amine or amino ether derivatives of 2,2,6,6-tetramethylpiperidine.

Compounds having isocyanate groups may be characterized by the parameter "% NCO," which is the amount of isocyanate groups by weight based on the weight of the compound. The parameter % NCO is measured by the method of ASTM D 2572-97(2010).

When a ratio is said herein to be X:1 or greater, it is meant that the ratio is Y:1, where Y is greater than or equal to X. For example, if a ratio is said to be 3:1 or greater, that ratio may be 3:1 or 5:1 or 100:1 but may not be 2:1. Similarly, when a ratio is said herein to be W:1 or less, it is meant that the ratio is Z:1, where Z is less than or equal to W. For example, if a ratio is said to be 15:1 or less, that ratio may be 15:1 or 10:1 or 0.1:1 but may not be 20:1.

The present invention involves a two component adhesive that contains an isocyanate component and a polyol component. The isocyanate component contains a prepolymer, which is the reaction product of reactants (the "prepolymer reactants") that include one or more aromatic monomeric polyisocyanates and one or more polyols. Preferred aromatic monomeric polyisocyanates are isomers of toluylene-diisocyanate (TDI), isomers of naphthalene-diisocyanate (NDI), isomers of diphenylmethane-diisocyanate (MDI), and mixtures thereof. Preferred are isomers of MDI; more preferred is 4,4'-MDI. The reactants may optionally contain one or more aliphatic polyisocyanate. Among aliphatic polyisocyanates, preferred are hydrogenated MDI, isophorone diisocyanate, hexan-1,6-diisocyanate, and mixtures thereof. Preferably, the reactants contain no aliphatic polyisocyanate.

The prepolymer reactants contain one or more polyol. Preferred polyols are one or more polyether polyols, one or more polyester polyols, and mixtures thereof. More preferred is a mixture of one or more polyether polyols with one or more polyester polyols. Preferably each polyol has viscosity at 25° C. of 10 mPa-s to 7,000 mPa-s, as measured by the method of ASTM D2196.

Preferably the amount of aromatic monomeric polyisocyanate in the prepolymer reactants is, by weight based on the weight of the reactants, 10% or more; more preferably 20% or more; more preferably 40% or more. Preferably the amount of aromatic monomeric polyisocyanate in the prepolymer reactants is, by weight based on the weight of the reactants, 90% or less; more preferably 80% or less. Preferably, the total of all the aromatic monomeric polyisocyanates plus all the polyols in the prepolymer reactants form a proportion of the reactants, by weight based on the weight of the prepolymer reactants, of 80 to 100%, more preferably 90 to 100%; more preferably 95 to 100%.

Preferably the isocyanate-functional prepolymer has % NCO of 5% or more; more preferably 8% or more; more preferably 10% or more; more preferably 12% or more. Preferably the isocyanate-functional prepolymer has % NCO of 30% or less; more preferably 25% or less; more preferably 22% or less; more preferably 19% or less.

Preferably the isocyanate-functional prepolymer has viscosity at 25° C. of 300 mPa-s to 12,000 mPa-s, as measured by the method of ASTM D2196.

The polyol component contains one or more polyether polyol and one or more fatty triglyceride. The polyol component may optionally additionally contain one or more other polyol such as, for example, one or more polyester polyol, one or more alkane diol, or a mixture thereof. Preferably, the proportion of the polyol component by weight that is made up of one or more polyether and one or more fatty triglyceride is 90 to 100%, more preferably 95 to 100%, more preferably 98 to 100%. Preferably the polyol component contains no polyester polyol.

Preferably, the polyether polyol in the polyol component has kinematic viscosity at 25° C. of 25 centistokes (cST) or higher, more preferably 50 cST or higher. Preferably, the polyether polyol in the polyol component has kinematic viscosity at 25° C. of 1,000 cST or lower; more preferably 700 cST or lower; more preferably 400 cST or lower.

The one or more fatty triglyceride preferably contains one or more fatty triglyceride that has one or more attached hydroxyl group. Preferably, one or more fatty triglyceride is used in which one or more of the residues of organic carboxylic acid that is attached to the glycerol residue has a fatty group to which a hydroxyl group is attached; more preferably one or more of the residues of organic carboxylic acid is the residue of an organic carboxylic acid that has a fatty group containing 12 to 20 carbon atoms and a hydroxyl group attached to the fatty group; more preferably one or more of the residues of organic carboxylic acid is the residue of ricinoleic acid. A preferred fatty triglyceride is castor oil. It is contemplated that castor oil contains 50% or more by weight of molecules in which all three residues of fatty acid have a hydroxyl group attached. It is also contemplated that castor oil normally further contains some molecules to which only one hydroxyl group is attached and also contains some molecules to which no hydroxyl group is attached. It is acceptable to use a purified form of castor oil in which 1 weight % or less, based on the weight of the castor oil, is molecules with zero or one hydroxyl group.

Preferably, the fatty triglyceride has hydroxyl number of 100 or higher; more preferably 125 or higher; more preferably 150 or higher. Preferably, the fatty triglyceride has hydroxyl number of 250 or less; more preferably 210 or less; more preferably 180 or less.

Preferably, the fatty triglyceride contains water in the amount, by weight, of 0 to 1,000 ppm, more preferably 0 to 500 ppm.

Preferably, the amount of fatty triglyceride is, by weight based on the weight of the two component adhesive composition, 5% or more; more preferably 10% or more; more preferably 20% or more; more preferably 30% or more; more preferably 50% or more.

Also present in the polyol component is an additive ("additive (IIC)") that is either a UV absorber or a hindered amine light stabilizer or a mixture thereof. Preferably, additive IIC contains both one or more UV absorber and one or more hindered amine light stabilizer. Among UV absorbers, preferred are benzotriazole and derivatives of benzotriazole. Acceptable commercial products that can serve as additive IIC are, for example, TINUVIN™ 571 (BASF) and CHIGUARD™ U-1100 (Chitec).

The amount of polyether polyol, by weight based on the weight of the polyol component, is 0 to 50%, preferably 0 to 35%.

Preferably the amount of additive IIC, by weight based on the weight of the polyol component, is 2% or more; more preferably 5% or more; more preferably 8% or more. Preferably the amount of additive IIC, by weight based on the weight of the polyol component, is 20% or less; more preferably 15% or less.

Preferably, the amount of additive IIC, by weight based on the weight of the total two component adhesive composition, is 1% or more; more preferably 2% or more; more preferably 3% or more. Preferably, the amount of additive IIC, by weight based on the weight of the total two component adhesive composition, 12% or less; more preferably 10% or less; more preferably 8% or less.

Preferably the polyol component has viscosity of 100 to 10,000 mPa·s at 25° C., as measured using ASTM D2196.

Preferably, the weight ratio of the polyol component to the isocyanate component is 0.2:1 or higher; more preferably 0.3:1 or higher; more preferably 0.4:1 or higher. Preferably, the weight ratio of the polyol component to the isocyanate component is 2:1 or lower; more preferably 1.5:1 or lower; more preferably 1.1:1 or lower.

Preferably, the amount of solvent in the two component adhesive composition is, by weight based on the total weight of the two component adhesive composition, 0 to 5%; more preferably 0 to 2%; more preferably 0 to 1%.

It is contemplated that the two components of the adhesive composition are made separately and then, if desired, stored until it is desired to use the adhesive composition. Preferably, both the isocyanate component and the polyol component are each liquid at 25° C. When it is desired to use the adhesive composition, the isocyanate component and the polyol component are brought into contact with each other and mixed together. It is contemplated that when these two components are brought into contact, a curing reaction begins in which the isocyanate groups react with the hydroxyl groups to form urethane links. The mixture formed by bringing the two components into contact is known herein as the curable mixture.

In a preferred method of forming a laminate, the mixture is in a liquid state. Preferably the mixture is a liquid at 25° C., but if it is solid at 25° C., it is acceptable to heat the mixture as necessary to put the mixture in a liquid state. A layer of the mixture is applied to a surface of a film.

Preferably, the thickness of the layer of the curable mixture is 1 to 5 µm.

Preferably, a surface of a second film is brought into contact with the layer of the curable mixture to form an uncured laminate. Preferably, the uncured laminate is made at a time when the amount of unreacted isocyanate groups present in the curable mixture is, on a molar basis compared to the amount of isocyanate groups present in the isocyanate component prior to contact with the polyol component, 50% or more; more preferably 75% or more; more preferably 90% or more.

The curable mixture is then cured or allowed to cure. The uncured laminate may be subjected to pressure, for example by passing through nip rollers, which may or may not be heated. The uncured laminate may be heated to speed the cure reaction.

Suitable films include paper, woven and nonwoven fabric, metal foil, polymers, and metal-coated polymers. Films optionally have a surface on which an image is printed with ink; the ink may be in contact with the adhesive composition. Preferred films are polymer films and metal-coated polymer films; more preferred are polymer films. Among polymer films, preferred are those that are oriented. Among polymer films, preferred are polypropylene films.

The following are examples of the present invention.

The following abbreviations are used:

Isomeric MDI=mixture of isomers of MDI, contains approximately 45 to 55% by weight 4,4' MDI Pure MDI=mixture of isomers of MDI, contains approximately 98% by weight 4,4' MDI Prepol-1=aromatic isocyanate functional prepolymer
% NCO=15%; viscosity=2500 mPa·s at 25° C.;
made from a reaction mixture of 55 parts by weight Isomeric MDI and 45 parts by weight polyols.

Prepol-2=aromatic isocyanate functional prepolymer
% NCO=13%; viscosity=5500 mPa·s at 25° C.;
made from a reaction mixture of 30 parts by weight Isomeric MDI, 20 parts by weight Pure MDI, and 50 parts by weight polyols.

Polyol-1=70% by weight polyether polyol, 30% by weight polyester polyol, viscosity=2000 mPa·s at 25° C.

Polyol-2=30% by weight polyether polyol, 70% by weight castor oil viscosity=550 mPa·s at 25° C.

Add-1=CHIGUARD™ U-1100 from Chitec, contains both a UV absorber and a hindered amine light stabilizer BOPP=oriented polypropylene film, thickness of 20 µm RH=relative humidity pbw=parts by weight Laminates were made as follows. On one surface of a sample of white BOPP, a layer of curable mixture was coated by making a drawdown. The thickness of the layer was 20 µm. A second film of white BOPP was placed on the layer of curable mixture, and the laminate was passed between nip rollers with pressure of approximately 2 bar. After UV exposure, each laminate was stored at room temperature (approximately 23° C.) until testing.

Each laminate was exposed to UV radiation in one of three methods. The first method of UV exposure ("Xenon") was in a xenon arc chamber, 47° C., 50% RH, for 13.2 hours; the lamp was a 340 nm lamp with power of 0.35 W/m$^2$. The second method of UV exposure ("QUV") was in a QUV chamber, 60° C., 50% RH, measured after 24 hours and after 72 hours, with a 340 nm lamp. The third method of UV exposure ("Sun") was to place the samples in direct sunlight, indoors at 20° C. for 2 months.

After exposure to UV radiation, the color of each sample was analyzed using a COLORGUIDE™ spectophotometer from BYK-Gardner, using the CIE Y, x, y scale with illuminant C and observer of 2°. The parameter yD is measured on each sample before and after exposure to UV radiation, and the difference is reported as ΔyD. Positive values of ΔyD mean that the yellowness increased due to exposure to UV radiation.

Three polyol components were made as follows:

p-comp-1=45 pbw of Polyol-1 plus 7.2 pbw of Add-1
p-comp-2=80 pbw of Polyol-2 plus 8.8 pbw of Add-1
p-comp-3=50 pbw of Polyol-3 plus 7.5 pbw of Add-1

Three curable mixtures were made as follows:

| Example | Isocyanate Component | | Polyol Component | |
|---|---|---|---|---|
|  | type | pbw | type | pbw |
| Comparative 1 | Prepol-1 | 100 | p-comp-1 | 52.2 |
| Example 2 | Prepol-2 | 100 | p-comp-2 | 88.8 |
| Example 3 | Prepol-3 | 100 | p-comp-3 | 57.5 |
| Comparative 4 | Prepol-1 | 100 | Polyol-1 | 45 |
| Comparative 5 | Prepol-2 | 100 | Polyol-2 | 80 |
| Comparative 6 | Prepol-3 | 100 | Polyol-3 | 50 |

Comparative 1 is a comparative example because the polyol component contains polyester polyol instead of polyether polyol. Comparatives 4, 5, and 6 are comparative examples because they do not contain UV absorber or hindered amine light stabilizer.

EXAMPLE 1: YELLOWNESS TESTING

Laminates were prepared and tested for yellowness as described above. The results were as follows:

Results of Xenon Test

|  | initial yD | final yD | ΔyD |
|---|---|---|---|
| Comparative 1 | 1.51 | 1.58 | 0.07 |
| Example 2 | 1.65 | 1.68 | 0.03 |
| Example 3 | 1.54 | 1.56 | 0.02 |

Results of QUV Test after 24 Hours

|  | initial yD | final yD | ΔyD |
|---|---|---|---|
| Comparative 1 | 1.51 | 6.8 | 5.29 |
| Example 2 | 1.65 | 1.8 | 0.15 |
| Example 3 | 1.54 | 2.0 | 0.46 |

Results of QUV Test after 72 Hours

|  | initial yD | final yD | ΔyD |
|---|---|---|---|
| Comparative 1 | 1.51 | 15.5 | 13.9 |
| Example 2 | 1.65 | 6.04 | 4.39 |
| Example 3 | 1.54 | 6.8 | 5.26 |

Results of Sun Test

|  | initial yD | final yD | ΔyD |
|---|---|---|---|
| Comparative 1 | 1.51 | 8.0 | 6.49 |
| Example 2 | 1.65 | 1.85 | 0.2 |
| Example 3 | 1.54 | 3.5 | 1.96 |

In every test above, Comparative 1 had larger increase in yellowness than Example 2 and Example 3.

Results of QUV Test after 72 Hours

|  | initial yD | final yD | ΔyD |
|---|---|---|---|
| Comparative 4 | 1.51 | 59.3 | 57.8 |
| Comparative 5 | 1.65 | 42.5 | 40.85 |
| Comparative 6 | 1.54 | 46.7 | 45.16 |

Comparatives 4, 5, and 6 all showed large increase in yellowness after exposure to UV radiation.

EXAMPLE 2: CURE STUDIES AND ADHESIVE STRENGTH

The following tests were performed to compare samples with and without additive Add-1. The purpose is to demonstrate that the presence of Add-1 has no significant effect on either the curing rate of the formulation or on the final adhesive strength of the cured adhesive.

Comparative 1 and Comparative 4 are similar to each other except for the absence of Add-1 in Comparative 4. Example 2 and Comparative 5 are similar to each other except for the absence of Add-1 in Comparative 5. Example 3 and Comparative 6 are similar to each other except for the absence of Add-1 in Comparative 6.

Curing of the formulation was tested by bringing the two components into contact and mixing them together and then measuring viscosity at 40° C. as a function of time. Viscosity was measured by Brookfield rheometer LV DV 111+ according to the manufacturer's instructions.

To test the adhesion strength after the laminates cured, sections of each laminate were cut to width 25.4 mm (1 inch) and peeled in an INSTRON™ tensile tester at 300 mm/min according to ASTM F904-98. The maximum force is reported in grams of force for the sample of width 25.4 mm.

Viscosity results were measured at 40° C. after 60 minutes at 40° C. and were as follows:

| Sample | Viscosity (mPa-s) |
|---|---|
| Comparative 1 | 5,000 |
| Comparative 4 | 3,000 |
| Example 2 | 17,000 |
| Comparative 5 | 16,000 |
| Example 3 | 10,500 |
| Comparative 6 | 10,500 |

Within each similar pair, the differences in viscosity are considered insignificant.

Adhesive strength was measured after 6 hours of cure. Results were as follows:

| Sample | Adhesive Strength (grf) |
| --- | --- |
| Comparative 1 | 240 |
| Comparative 4 | 220 |
| Example 2 | 220 |
| Comparative 5 | 210 |
| Example 3 | 250 |
| Comparative 6 | 210 |

Within each similar pair, the differences in adhesive strength are considered insignificant.

The invention claimed is:

1. A method of forming a laminate comprising
 (a) forming an adhesive composition by bringing into contact components comprising
  (I) an isocyanate component comprising an isocyanate-functional prepolymer that is the reaction product of reactants that comprise
   (A) one or more aromatic polyisocyanates and
   (B) one or more polyol, and
  (II) a polyol component comprising
   (A) 0 to 50% by weight based on the weight of said polyol component, one or more polyether polyol,
   (B) 30% or more by weight based on the weight of said adhesive composition, one or more fatty triglyceride, and
   (C) one or more UV absorber or one or more hindered amine light stabilizer or a combination thereof,
 (b) applying a layer of said adhesive composition to a surface of a first film,
 (c) bringing said layer into contact with a surface of a second film to form a laminate;
 (d) after forming said laminate, curing said adhesive composition or allowing said adhesive composition to cure,
wherein steps (b) and (c) are performed at a time when 50 mole % or more of isocyanate groups on said prepolymer remain unreacted.

2. The method of claim 1 wherein said adhesive composition has an amount of solvent that is 0 to 5%.

3. The method of claim 1 wherein said fatty triglyceride has one or more pendant hydroxyl groups.

4. The method of claim 1 wherein said fatty triglyceride is castor oil.

5. A laminate formed by the method of claim 1.

6. A two component adhesive composition comprising
 (I) an isocyanate component comprising an isocyanate-functional prepolymer that is the reaction product of reactants that comprise
  (A) one or more aromatic monomeric polyisocyanates and
  (B) one or more polyol, and
 (II) a polyol component comprising
  (A) 0 to 50% by weight based on the weight of said polyol component, one or more polyether polyol,
  (B) 30% or more by weight based on the weight of said adhesive composition, one or more fatty triglyceride, and
  (C) one or more UV absorber or one or more hindered amine light stabilizer or a combination thereof.

7. The composition of claim 6 wherein said composition has an amount of solvent that is 0 to 5%.

8. The composition of claim 6 wherein said isocyanate component has % NCO of 12% to 19%.

9. The composition of claim 6 wherein said fatty triglyceride has one or more pendant hydroxyl groups.

10. The composition of claim 6 wherein said polyol component comprises a UV absorber and a hindered amine light stabilizer.

11. The composition of claim 6 wherein said fatty triglyceride is castor oil.

* * * * *